(12) United States Patent
Mullen et al.

(10) Patent No.: US 11,577,765 B2
(45) Date of Patent: Feb. 14, 2023

(54) WHEELBARROW ASSEMBLY (71) Applicant: The Ames Companies, Inc., Camp Hill, PA (US)

(72) Inventors: Joshua O. Mullen, Duncannon, PA (US); Benjamin Stout, Camp Hill, PA (US); Maxime Richard, Orlando, FL (US)

(73) Assignee: The Ames Companies, Inc., Camp Hill, PA (US)

( * ) Notice: Subject to any disclaimer, the term of this patent is extended or adjusted under 35 U.S.C. 154(b) by 0 days.

(21) Appl. No.: 17/307,192

(22) Filed: May 4, 2021

(65) Prior Publication Data
US 2022/0355843 A1 Nov. 10, 2022

(51) Int. Cl.
*B62B 1/20* (2006.01)

(52) U.S. Cl.
CPC .................................... *B62B 1/206* (2013.01)

(58) Field of Classification Search
CPC .......... B62B 1/206; B62B 5/067; B65D 85/68
See application file for complete search history.

(56) References Cited

U.S. PATENT DOCUMENTS

| | | | | |
|---|---|---|---|---|
| 2,800,335 A * | 7/1957 | Clapp | ................. | B62B 1/208 280/42 |
| 3,552,760 A * | 1/1971 | Sine | ................. | B62B 1/208 280/653 |
| 3,620,364 A * | 11/1971 | Lynch | ................. | B62B 1/206 206/335 |
| 3,722,904 A * | 3/1973 | Puckett | ................. | B62B 1/208 280/653 |
| 4,353,596 A * | 10/1982 | Gibson | ................. | B62B 1/12 280/659 |
| 4,991,716 A * | 2/1991 | Havlovitz | ................. | B65D 85/68 206/335 |
| 6,550,104 B2 * | 4/2003 | Cacciacarne | ................. | B62B 5/06 D34/27 |
| 7,104,565 B1 * | 9/2006 | Albert | ................. | B62B 1/206 280/47.18 |

(Continued)

FOREIGN PATENT DOCUMENTS

| | | |
|---|---|---|
| GB | 2071539 A | 9/1981 |
| GB | 2496629 A | 5/2013 |

(Continued)

OTHER PUBLICATIONS http://jeepwheelbarrows.com, Model WH5S-UPS, website and photographs, Aug. 6, 2019, 6 pages.

*Primary Examiner* — Jeffrey J Restifo
(74) *Attorney, Agent, or Firm* — Brooks Kushman P.C.

(57) ABSTRACT

A wheelbarrow assembly is disclosed with a wheelbarrow tray, a wheel to connect to the tray for rotation relative to the tray, for transportation of the tray upon an underlying support surface and a pair of handle assemblies. Each handle assembly is provided with a first unitarily formed handle portion with a distal end, an intermediate region, and a proximal end. The proximal end has a cross-section that is reduced relative to a cross-section of the intermediate region. The second handle portion is provided with a distal end and a proximal end; the proximal end having a cross-section that is sized to receive the first handle distal end cross-section therein to assemble the second handle portion to the first handle portion.

22 Claims, 8 Drawing Sheets

(56) References Cited

U.S. PATENT DOCUMENTS

| | | | | |
|---|---|---|---|---|
| 7,226,072 | B2* | 6/2007 | Shapiro | B62B 1/208 |
| | | | | 280/47.33 |
| 7,866,686 | B2* | 1/2011 | Conaway | B62B 1/208 |
| | | | | 280/653 |
| 9,701,462 | B2* | 7/2017 | Hyp | B65D 85/62 |
| 10,933,898 | B2* | 3/2021 | Wildfeuer | B62B 1/206 |
| 2004/0256838 | A1* | 12/2004 | Shapiro | B62B 1/208 |
| | | | | 280/653 |
| 2005/0104334 | A1* | 5/2005 | Conaway | B62B 1/208 |
| | | | | 280/653 |
| 2007/0007738 | A1* | 1/2007 | Albert | B62B 1/206 |
| | | | | 280/47.31 |
| 2008/0041740 | A1* | 2/2008 | Hyp | B65D 85/62 |
| | | | | 206/349 |
| 2013/0200582 | A1* | 8/2013 | Feick | B62B 5/065 |
| | | | | 280/47.17 |
| 2020/0269892 | A1* | 8/2020 | Wildfeuer | B62B 1/206 |
| 2021/0114641 | A1* | 4/2021 | Chenge | B62B 1/206 |
| 2021/0155277 | A1* | 5/2021 | Milo | B62B 1/186 |
| 2022/0168885 | A1* | 6/2022 | Hurt | B25G 3/04 |

FOREIGN PATENT DOCUMENTS

| | | | |
|---|---|---|---|
| GB | 2520000 | B | 3/2016 |
| GB | 2555069 | A | 5/2018 |

* cited by examiner

WHEELBARROW ASSEMBLY

TECHNICAL FIELD

Various embodiments related to wheelbarrow assemblies.

BACKGROUND

Wheelbarrow assemblies include handles for manual operation, pivoting and transportation of the wheelbarrow assembly.

SUMMARY

According to an embodiment, a wheelbarrow assembly is provided with a wheelbarrow tray, a wheel to connect to the tray for rotation relative to the tray, for transportation of the tray upon an underlying support surface and a pair of handle assemblies. Each handle assembly is provided with a first unitarily formed handle portion with a distal end, an intermediate region, and a proximal end. The proximal end has a cross-section that is reduced relative to a cross-section of the intermediate region. The second handle portion is provided with a distal end and a proximal end; the proximal end having a cross-section that is sized to receive the first handle distal end cross-section therein to assemble the second handle portion to the first handle portion.

According to a further embodiment, the first handle portion and the second handle portion are each tubular.

According to another further embodiment, the proximal end of the first handle portion is provided with at least one aperture.

According to an even further embodiment, the proximal end of the second handle portion is provided with at least one aperture in alignment with the aperture of the first handle portion.

According to another even further embodiment, a fastener is provided to connect the proximal end of the first handle portion with the proximal end of the second handle portion.

According to another further embodiment, the proximal end of the second handle portion is provided with a square cross-section.

According to an even further embodiment, the proximal end of the first handle portion is swaged to the reduced cross-section.

According to another even further embodiment, the swaged portion of the proximal end of the first handle portion has an overall perimeter sized to fit within the square cross-section of the second handle portion.

According to another even further embodiment, the swaged portion is provided with four side walls and each side wall is recessed.

According to a further embodiment, a collar is provided to the proximal end of the first handle portion adjacent to the intermediate region to minimize contact between the intermediate region of the first handle portion and the proximal end of the second handle portion.

According to an even further embodiment, the collar is attached to the first handle portion by an adhesive.

According to another even further embodiment, the collar is provided with a through aperture with four internal corners.

According to another even further embodiment, the collar is provided with an angled aperture sized to receive the swaged cross-section of the proximal end of the first handle portion.

According to a further embodiment, the first handle portion and the second handle portion when assembled do not exceed thirty-two inches allowing the handle to fit into a single shipping package.

According to a further embodiment, the first handle portion and second handle portion are comprised of steel.

According to an embodiment, a packaged wheelbarrow assembly is provided with a first box, sized to receive a disassembled tray, a wheel, and a pair of handle assemblies packaged therein. The wheel connects to the tray for rotation relative to the tray and is used for transportation of the tray upon an underlying support surface. The pair of handle assemblies is each provided with a first handle portion and a second handle portion. The first unitarily formed handle portion with a distal end, an intermediate region, and a proximal end. The proximal end having a cross-section that is reduced relative to a cross-section of the intermediate region. The second handle portion with a distal end and a proximal end. The proximal end having a cross-section that is sized to receive the first handle distal end cross-section therein to assemble the second handle portion to the first handle portion.

According to a further embodiment, the first box sized to receive a wheelbarrow tray has an approximate length of forty centimeters and an approximate width of twenty-seven centimeters.

According to another embodiment, method of packaging a wheelbarrow assembly places a pair of lengthwise disassembled handle assemblies in a first box. A wheelbarrow tray is placed into the first box. Then a hardware kit is place into a second box; and the second box is placed into the wheelbarrow tray.

According to a further embodiment, the pair of lengthwise disassembled handle assemblies are placed in a third box. The third box is placed into the first box to place the pair of lengthwise disassembled handle assemblies within the first box.

According to yet another embodiment, a packaged wheelbarrow assembly is provided with a first box, a wheelbarrow tray oriented within the first box, a wheel connected to the tray for rotation relative to the tray, oriented within the first box, and a pair of unitarily formed tubular handle assemblies. The first handle portion with a distal end, an intermediate region, and a proximal end. The proximal end having a cross-section that is reduced relative to a cross-section of the intermediate region. The second handle portion with a distal end and a proximal end. The proximal end having a cross-section that is sized to receive the first handle distal end cross-section therein to assemble the second handle portion to the first handle portion. The packaged wheelbarrow assembly is also provided with a second box to contain a hardware kit oriented inside the tray and a pair of collars. Each collar is provided with a through aperture with four internal corners and installed upon the proximal end of one of the pair of first handle portions.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Conventionally, wheelbarrow assemblies are retailed assembled, which may require preassembly by the manufacturer, or the retailer. Assembled wheelbarrow assemblies require significant retail space in order to house and display the wheelbarrow assemblies to consumers at the retail location. The prior art has also provided wheelbarrow assemblies that are packaged and shipped in multiple boxes. Multiple boxes create additional cost and inconvenience to the customer. Reducing the packaging size allows manufacturers to streamline direct to consumer shipping capabilities. In order to fit all the wheelbarrow assembly components in one box, while minimizing an overall size of the box, a multi-piece handle assembly is offered.

Figure 1:
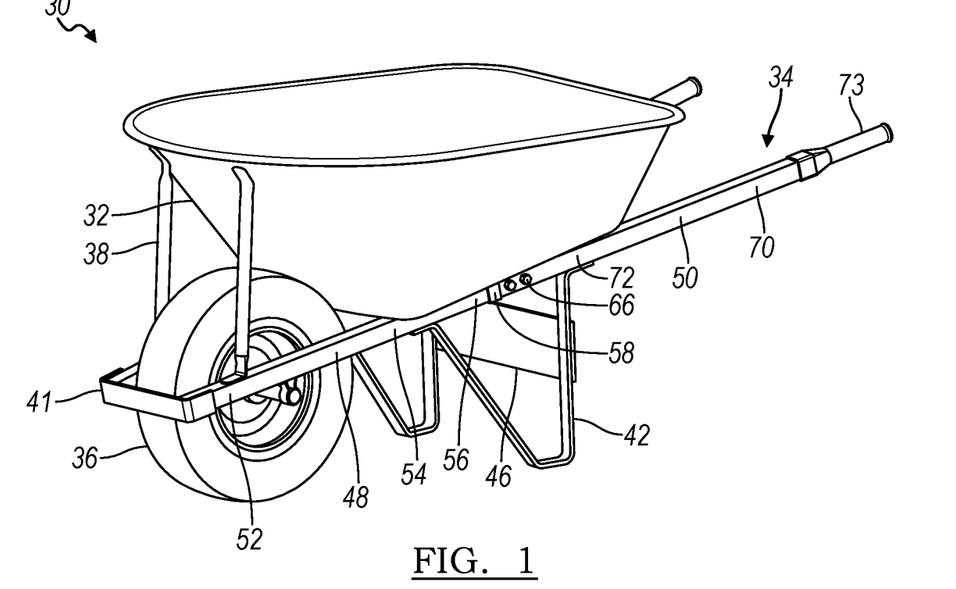
FIG. 1 is a front perspective view of a wheelbarrow assembly according to an embodiment.
Figure 2:
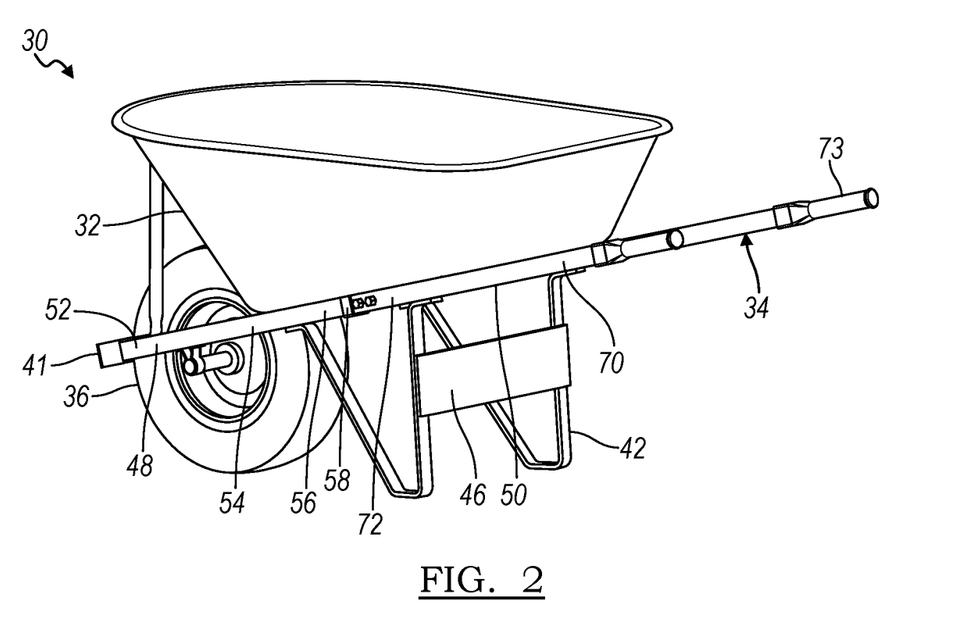
FIG. 2 is a rear perspective view of the wheelbarrow assembly of FIG. 1.
Figure 3:
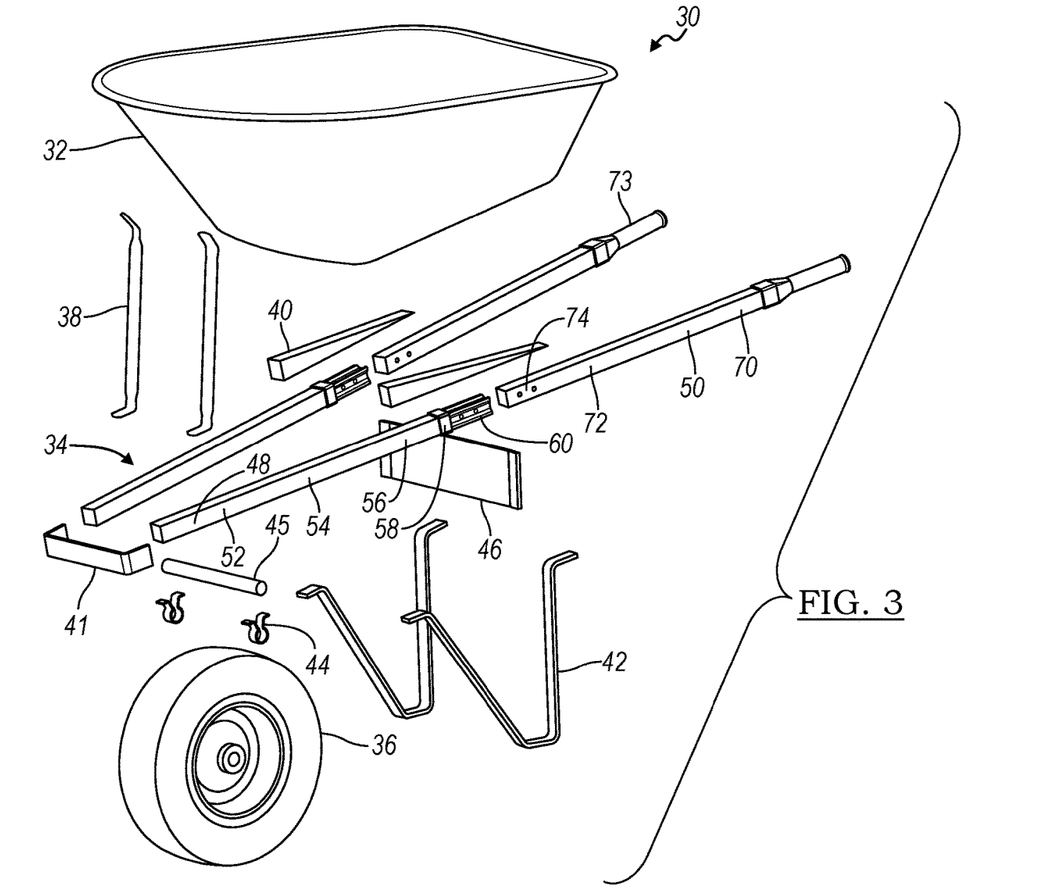
FIG. 3 is an exploded front perspective view of the wheelbarrow assembly of FIG. 1.

FIGS. 1-3 illustrate a wheelbarrow assembly 30 according to an embodiment. As depicted, the wheelbarrow assembly 30 is a single-wheeled manually operated and driven vehicle with a tray 32 for carrying and transporting loads. The wheelbarrow assembly 30 is employed for gardening, construction, yardwork, home improvement projects, and the like.

The wheelbarrow assembly 30 is provided with a tray 32, a pair of handle assemblies 34, and a wheel 36. A pair of upright support brackets 38, a pair of angled brackets 40, and a pair of legs 42 connect to the tray 32. The pair of handle assemblies 34 are mounted to the angled brackets 40 that are connected to the tray 32. An end bracket 41 is connected to the pair of handle assemblies 34. A pair of bushings 44 are mounted to the pair of handle assemblies 34 and the wheel 36 is mounted to an axle 45 in the bushings 44. The wheel 36 connects to the tray 32 for rotation relative to the tray 32 and is used for transportation of the tray 32 upon an underlying support surface, such as the ground or a floor. The upright support brackets 38 are positioned on either side of the wheel 36. Additionally, the pair of legs 42 is provided with a cross-member 46.

Referring to FIG. 3, the pair of handle assemblies 34 is illustrated disassembled demonstrating that the pair of handle assemblies 34 are each provided with a first unitarily formed handle portion 48 and a second handle portion 50, each of which are tubular and made from steel, or any suitable material, such as wood, fiberglass, or the like.

Figure 4:
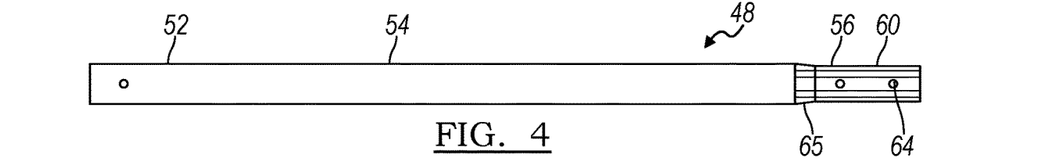
FIG. 4 is a side elevation view of a first handle portion of the wheelbarrow assembly of FIG. 1, according to an embodiment.

FIG. 4 illustrates the first handle portion 48 in greater detail. The first handle portion 48 has a distal end 52, an intermediate region 54, and a proximal end 56. The proximal end 56 is provided with a cross-section that is reduced relative to a cross-section of the intermediate region 54. The proximal end 56 is also provided with a collar 58 (FIGS. 8 and 9) that minimizes contact between the intermediate region 54 of the first handle portion 48 and the second handle portion 50.

With continued reference to FIG. 4, the proximal end 56 of the first handle portion 48 is swaged to reduce the cross-section. The swaged portion 60 is provided with an overall perimeter sized to fit within a cross-section of the second handle portion 50. The swaged portion 60 is provided with at least one aperture 64 sized to receive a fastener 66 and align with an aperture of the second handle portion 50.

Figure 5:
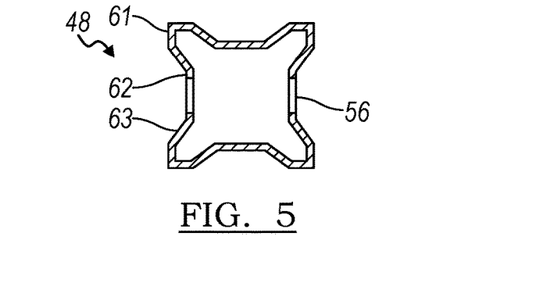
FIG. 5 is an axial end view of the first handle portion of FIG. 4.

An end view of the swaged portion 60 is shown in FIG. 5 illustrating that the proximal end portion 56 is not uniform with the rest of the first handle portion 48. Instead, the swaged portion 60 is provided with four corners 61 that are offset within the four corners of the intermediate region 54. In order to reduce the overall profile, four recessed side walls 62 are provided within the overall perimeter of the four corners 61, with angled portions 63 connecting the corners 61 and the sidewalls 62. Referring again to FIG. 4, the first handle portion 48 includes a transitional region 65 between the intermediate region 54 and the proximal end 56. The transitional region 65 is tapered from the larger perimeter of the intermediate region 54 to the reduced cross-section of the swaged proximal end 56.

Figure 6:
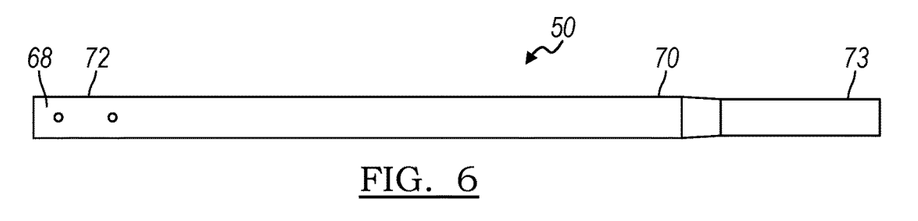
FIG. 6 is a side elevation view of a second handle portion of the wheelbarrow assembly of FIG. 1.
Figure 7:
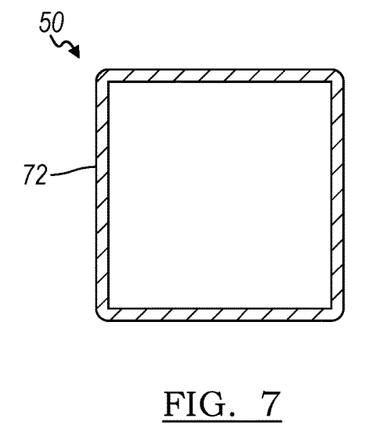
FIG. 7 is an axial end view of the second handle portion of FIG. 6.

The second handle portion 50, illustrated in FIG. 6, is provided with a distal end 70 and a proximal end 72. The proximal end 72 is provided with a square cross-section, illustrated in FIG. 7, that is sized to receive the swaged portion 60 of the first handle portion 48 in order to assemble the second handle portion 50 to the first handle portion 48. The proximal end 72 of the second handle portion 50 is provided with at least one aperture 68. The aperture 68 aligns with the aperture 64 of the first handle portion 48. Additionally, a grip region 73 is provided to the distal end 70 of the second handle portion 50.

Figure 8:
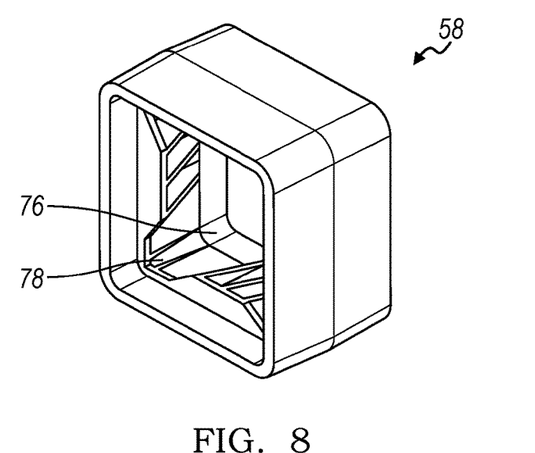
FIG. 8 is a perspective view of a collar of the wheelbarrow assembly of FIG. 1, according to an embodiment.
Figure 9:
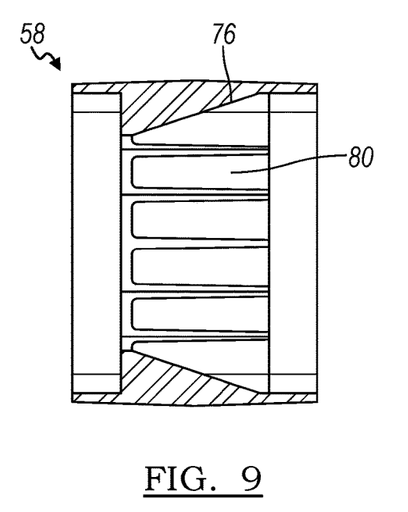
FIG. 9 is a side section view of the collar of FIG. 8.
Figure 10:
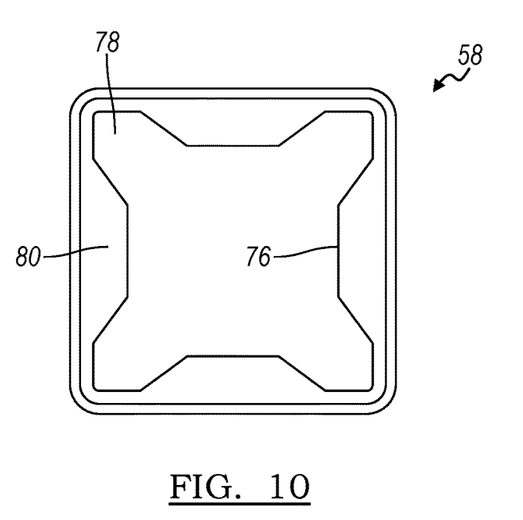
FIG. 10 is an axial end view of the collar of FIG. 8.

FIGS. 8-10 illustrate the collar 58 of the first handle portion 48 in more detail. The collar 58 is slid onto the proximal end 56 of the first handle portion 48 adjacent to the intermediate region 54. The collar 58 may be attached by an adhesive. The collar 58 is provided with an angled through aperture 76 with four internal corners 78. The angled through aperture 76 is sized to receive the swaged cross-section 60 of the proximal end 56 of the first handle portion 48. The interior of the collar 58 is provided with a ridged lining 80 sized to match the shape of the recessed side walls 62 of the swaged portion 60 of the first handle portion 48. The angled through aperture 76 may align with the tapered transitional region 65 of the first handle portion 48.

Figure 11:
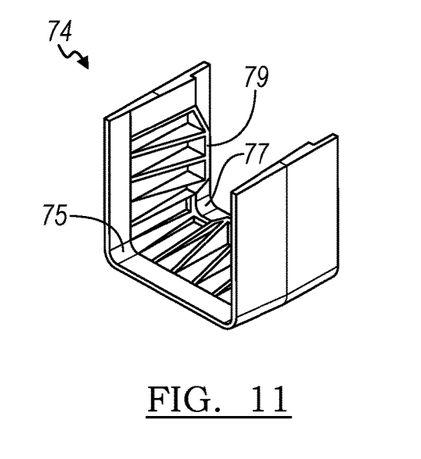
FIG. 11 is a perspective view of a collar of FIG. 8 of the wheelbarrow assembly of FIG. 1, according to another embodiment.

The collar 58 of FIGS. 8-10 includes four sides to surround the proximal end 56 of the first handle portion 48. Referring now to FIG. 11, an alternate collar 74 is illustrated with three sides and an angled through slot 75, with two corners 77, and three projections 79 to engage the offset sidewalls 62 of the proximal end 56 of the first handle portion 48.

Figure 12:
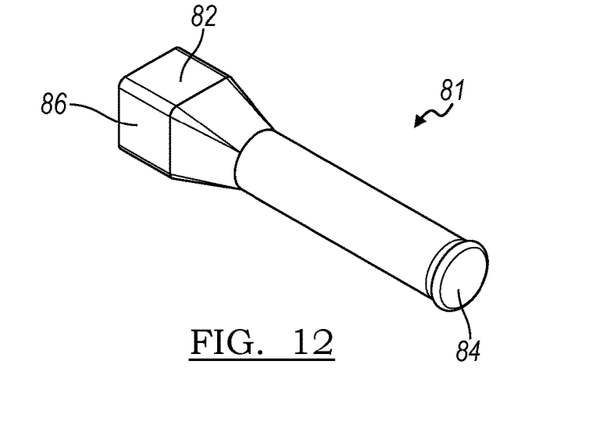
FIG. 12 is a perspective view of a grip of the wheelbarrow assembly of FIG. 1.
Figure 13:
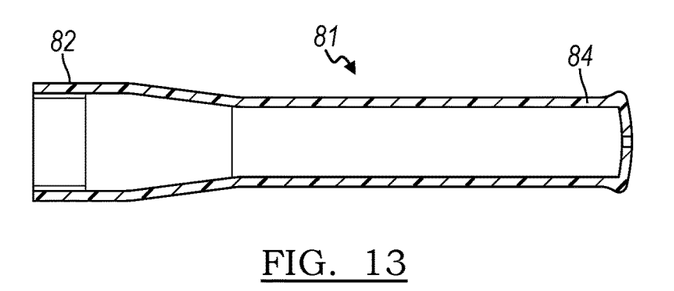
FIG. 13 is a side section view of the grip of FIG. 12.

FIGS. 12 and 13 illustrate a grip 81 that is attached by an adhesive to the grip region 73 of the distal end 70 of the second handle portion 50. The grip 81 has a first, open end 82 and a second, closed end 84. The second end 84 has a smaller cross-section than the first end 82. The first end 82 is provided with a square cross-section which allows the grip 81 to fit over a square cross-section of the second handle portion 50.

Figure 14:
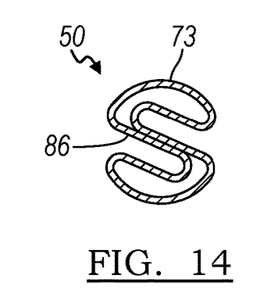
FIG. 14 is an axial end view of the second handle portion of FIG. 6.
Figure 15:
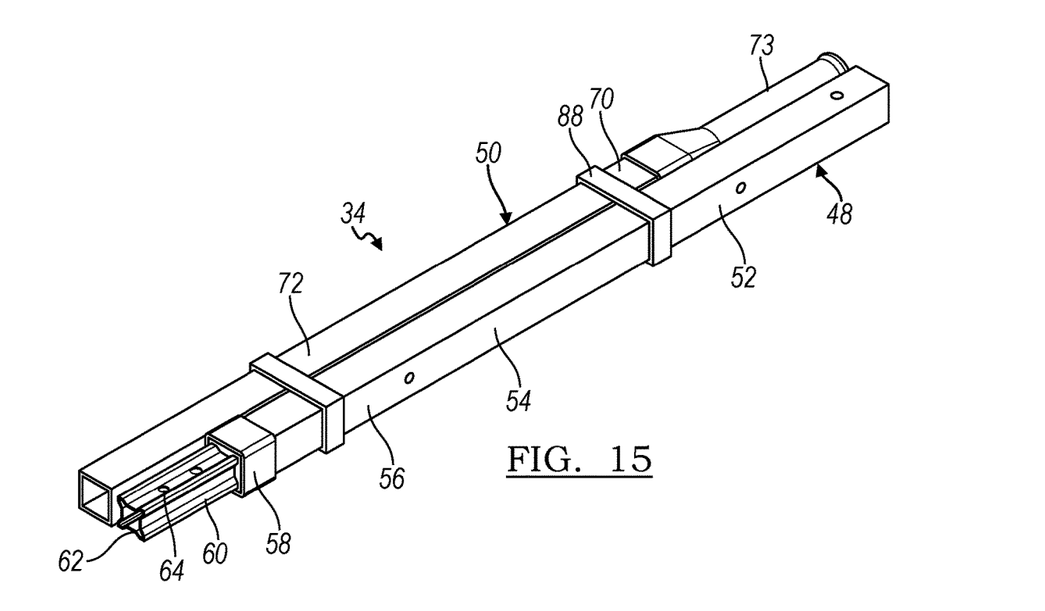
FIG. 15 is a perspective view of a handle assembly of the wheelbarrow assembly of FIG. 1, illustrated partially packaged, according to an embodiment.
Figure 16:
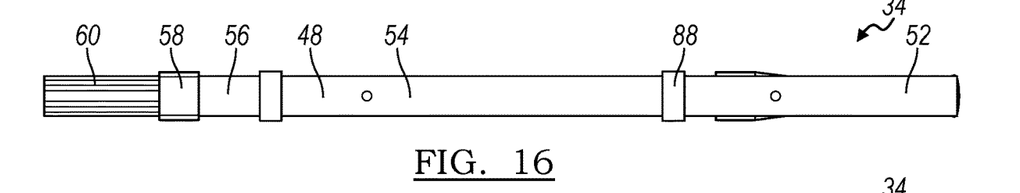
FIG. 16 is a top side view of the handle assembly of FIG. 15.
Figure 17:
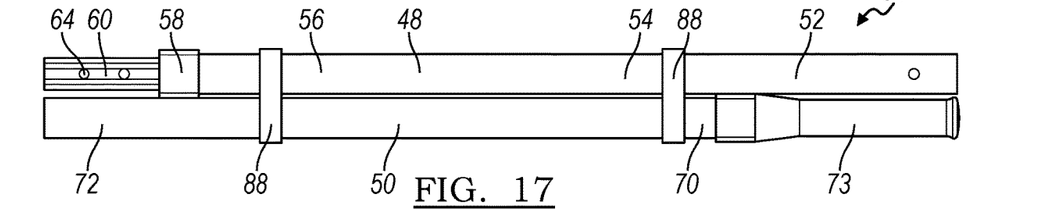
FIG. 17 is a side elevation view of the handle assembly of FIG. 15.

FIG. 14 is an axial end view of the grip region 73 of the second handle portion 50. The grip region 73 is also swaged to reduce the cross-section, and to form a round overall profile for receipt in the closed end 84 of the grip 81. The cross-section is reduced by overlapping surfaces 86 that are oriented within the round perimeter.

FIGS. 15-18 illustrate the pair of handle assemblies 34 partially packaged. The pair of handle assemblies 34 may be packaged in one box. Each combination of the first handle portion 48 and the second handle portion 50 may be connected by a banding material 88. The first handle portion 48 and the second handle portion 50 are placed together so that the swaged portion 60 of the first handle portion 48 is located opposite to the grip region 73 of the second handle portion 50. In other words, the swaged recessed portion 60 of the first handle portion 48 is located next to the square cross-section of the second handle portion 50. This also indicates that an end portion 68 of the distal end 52 of the first handle portion 48 is located next to the end portion of the grip 81 of the second handle portion 50, as shown in greater detail in FIG. 18. Additionally, when the first handle portion 48 and the second handle portion 50 are assembled, the assembled handle pieces do not exceed thirty-two inches in overall length to minimize an overall length of the packaging.

By packaging the pair of handle assemblies 34 with the first handle portion 48 and the second handle portion 50 aligned lengthwise, the wheelbarrow assembly 30 is sufficiently compact to be packaged into a single box. A first box 92 is illustrated in phantom in FIGS. 19-22 to house the disassembled wheelbarrow assembly 30. The first box 92 is sized to receive the wheelbarrow tray 32 and has an approximate length of forty centimeters and an approximate width of twenty-seven centimeters, according to an example. The wheelbarrow tray 32 is sized to receive a second box 94, which is provided with a hardware kit and additional assembly pieces including the brackets 38, 40, 41, the pair of legs 42, the cross-member 46, the wheel 36, the axle 45, fasteners and the like. The pair of handle assemblies 34 are placed lengthwise in a third box 96, which allows them to be situated next to the wheelbarrow tray 32 inside the first box 92, while contained and separated from the tray 32 and the second box 94.

Figures 18, 19:
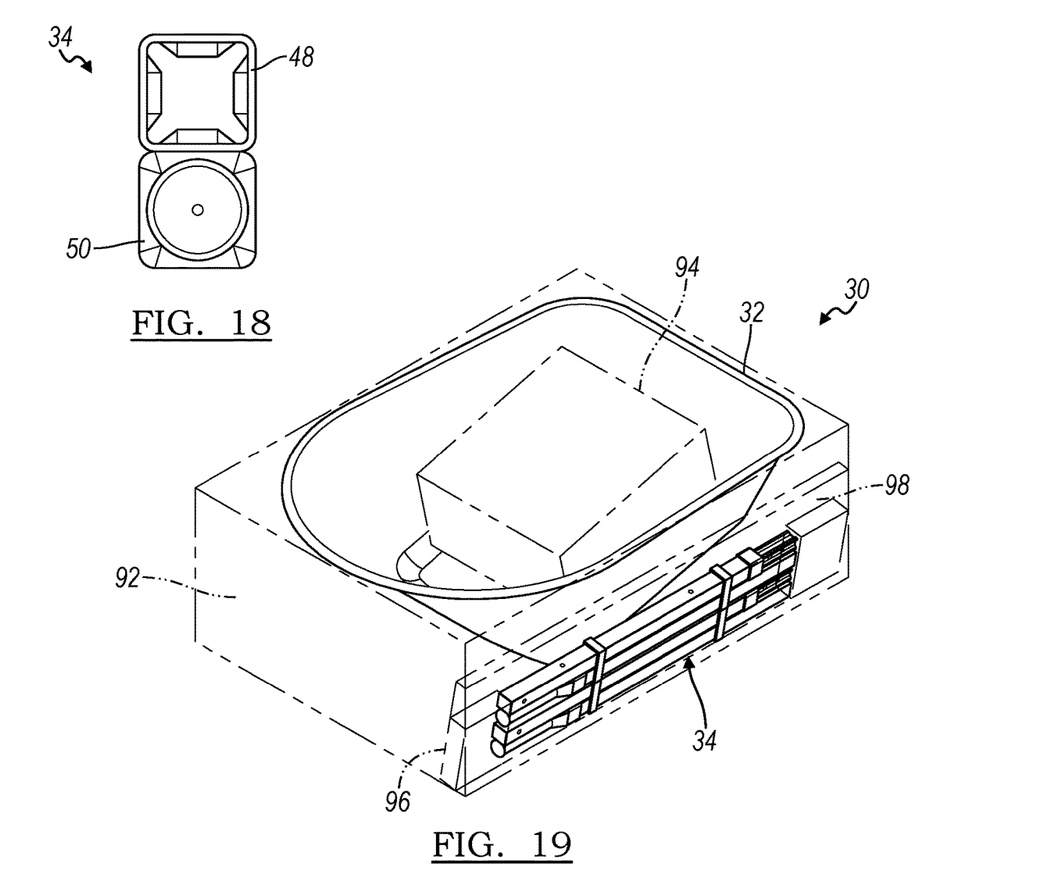
FIG. 18 is an axial end view of the handle assembly of FIG. 15.
FIG. 19 is a front perspective view of a packaged wheelbarrow assembly according to an embodiment.
Figure 20:
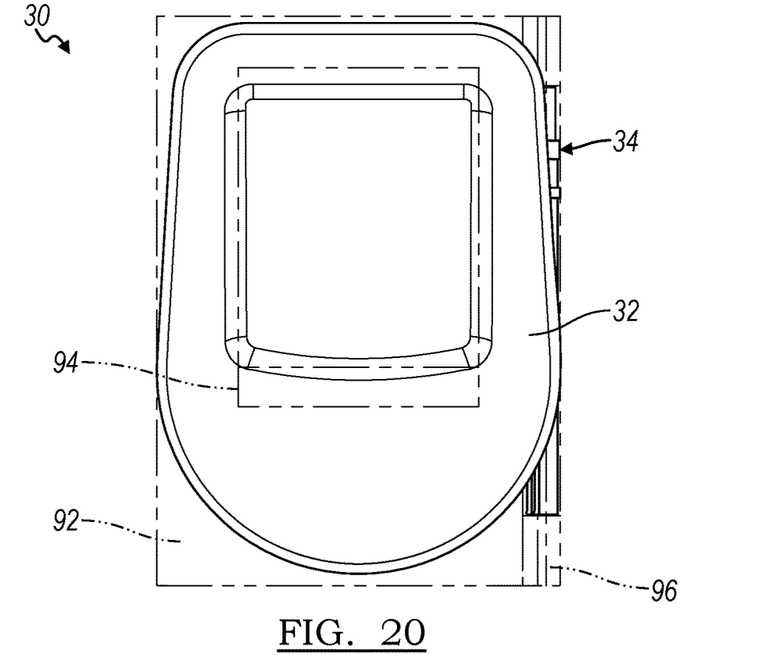
FIG. 20 is a top plan view of the packaged wheelbarrow assembly of FIG. 19.
Figure 21:
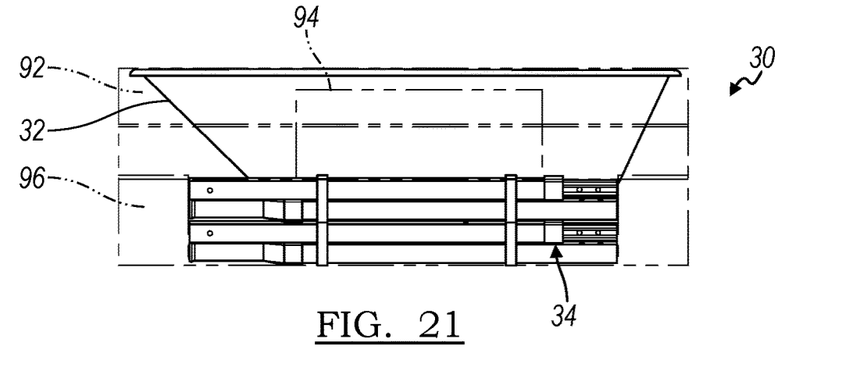
FIG. 21 is a side elevation view of the packaged wheelbarrow assembly of FIG. 19.
Figure 22:
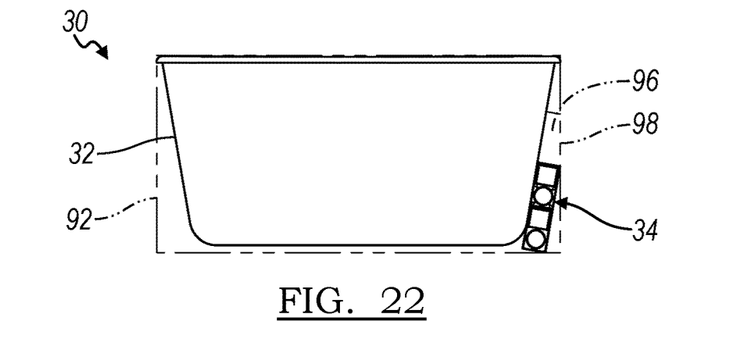
FIG. 22 is a front elevation view of the packaged pair of handle assemblies of the packaged wheelbarrow of FIG. 19.
Figure 23:
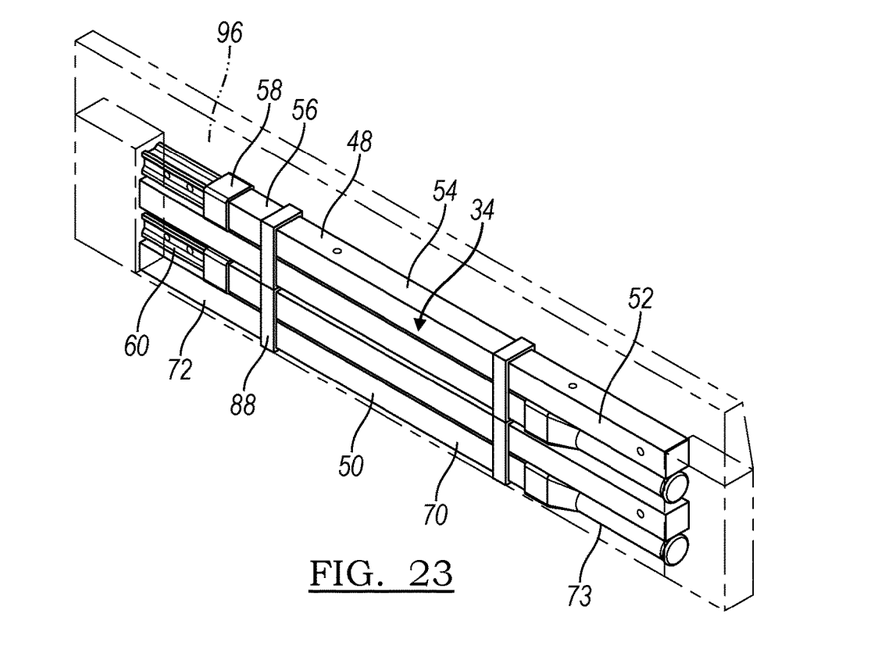
FIG. 23 is a perspective view of a packaged pair of handle assemblies of the packaged wheelbarrow of FIG. 19.
Figure 24:
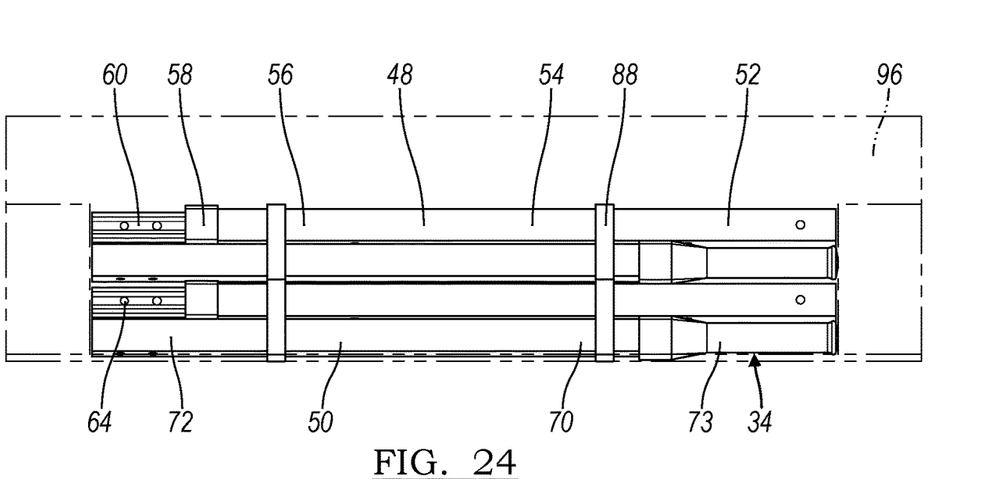
FIG. 24 is a side elevation view of the packaged pair of handle assemblies of FIG. 23.
Figure 25:
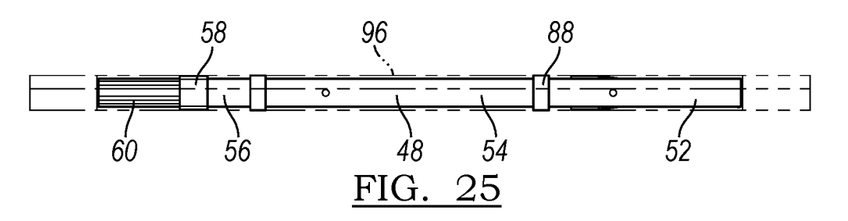
FIG. 25 is a top side view of the packaged pair of handle assemblies of FIG. 23.
Figure 26:
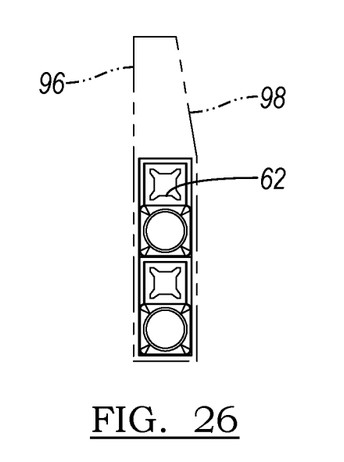
FIG. 26 is an elevation end view of the packaged pair of handle assemblies of FIG. 23.

FIGS. 23-26 illustrate the third box 96, which holds the pair of handle assemblies 34. The distal end 52 of the first handle portion 48 is placed on top of the proximal end 72 of the second handle portion 50. Additionally, the handle assemblies 34 are stacked on top of one another. This compactness reduces the width of the third box 96 so that the third box 96 can fit within the remaining space of the first box 92. FIG. 26 shows the handle assemblies 34 stacked on top of one another from the side of the third box 96. An extended region of the third box 96 includes a tapered region 98 (FIGS. 19, 22 and 26). As illustrated in FIG. 22, the tapered region 98 assists in aligning the third box 96 within the first box 92 along a tapered side of the tray 32.

Figure 27:
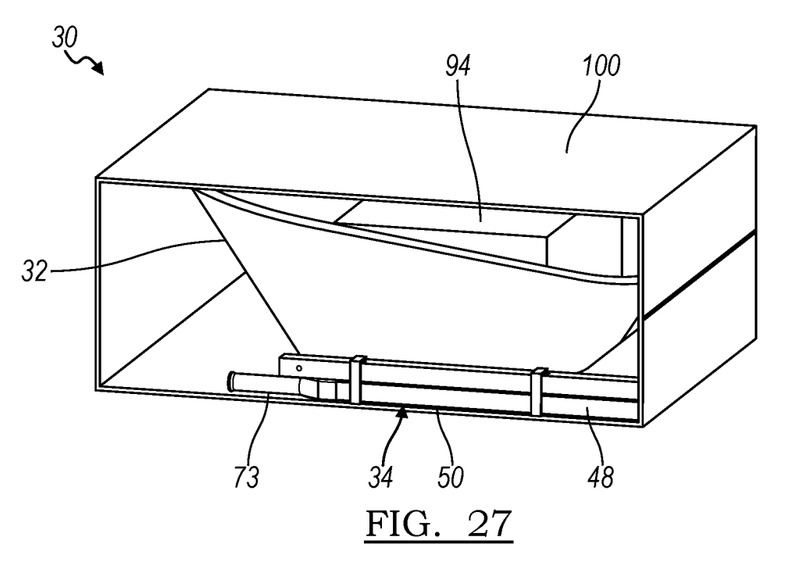
FIG. 27 is a side perspective view of a packaged wheelbarrow assembly according to another embodiment.

FIG. 27 illustrates the packaging of the wheelbarrow assembly 30 according to another embodiment. The wheelbarrow tray 32 is housed within a first box 100. The second box 94 is placed within the tray 32. The handle assemblies 34 are each oriented at an opposed later side of the tray 32 within the first box 100.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A wheelbarrow assembly comprising:
    a wheelbarrow tray;
    a wheel to connect to the tray for rotation relative to the tray, for transportation of the tray upon an underlying support surface; and
    a pair of handle assemblies, each handle assembly comprising:
        a first unitarily formed handle portion with a distal end, an intermediate region and a proximal end, the proximal end having a cross-section that is reduced relative to a cross-section of the intermediate region, and
        a second handle portion with a distal end and a proximal end, the proximal end having a cross-section that is sized to receive the first handle proximal end cross-section therein to assemble the second handle portion to the first handle portion;
    wherein the proximal end of the second handle portion has a square cross-section;
    wherein the proximal end of the first handle portion is swaged to the reduced cross-section; and
    wherein the swaged portion of the proximal end of the first handle portion has an overall perimeter sized to fit within the square cross-section of the second handle portion.

2. The wheelbarrow assembly of claim 1, wherein the swaged portion has four side walls and each side wall is recessed.

3. The wheelbarrow assembly of claim 1, further comprising a collar located at the proximal end of the first handle portion adjacent to the intermediate region to minimize contact between the intermediate region of the first handle portion and the proximal end of the second handle portion.

4. The wheelbarrow assembly of claim 3, wherein the collar is attached to the first handle portion by an adhesive.

5. The wheelbarrow assembly of claim 3, wherein the collar has a through aperture with four internal corners.

6. The wheelbarrow assembly of claim 3, wherein the collar has an angled aperture sized to receive the swaged cross-section of the proximal end of the first handle portion.

7. The wheelbarrow assembly of claim 1, wherein the first handle portion and the second handle portion are each tubular.

8. The wheelbarrow assembly of claim 1, wherein the proximal end of the first handle portion has at least one aperture.

9. The wheelbarrow assembly of claim 8, wherein the proximal end of the second handle portion has at least one aperture in alignment with the aperture of the first handle portion.

10. The wheelbarrow assembly of claim 9, further comprising a fastener to connect the proximal end of the first handle portion with the proximal end of the second handle portion.

11. The wheelbarrow assembly of claim 1, wherein the first handle portion and second handle portion when assembled do not exceed thirty-two inches allowing the handle portions to fit into a single shipping package.

12. The wheelbarrow assembly of claim 1, wherein the first handle portion and second handle portion are comprised of steel.

13. A packaged wheelbarrow assembly comprising:
a first box sized to receive a wheelbarrow tray; and
a wheelbarrow assembly of claim 1 disassembled and packaged within the first box.

14. The packaged wheelbarrow assembly of claim 13, wherein the first box sized to receive a wheelbarrow tray has an approximate length of forty centimeters and an approximate width of twenty-seven centimeters.

15. A packaged wheelbarrow assembly comprising:
a first box;
a wheelbarrow tray oriented within the first box;
a wheel to connect to the tray for rotation relative to the tray, for transportation of the tray upon an underlying support surface, oriented within the first box;
a pair of unitarily-formed, tubular first handle portions oriented within the first box, each of the pair of first handle portions comprising a distal end, an intermediate region and a swaged proximal end with a cross-section that is reduced relative to a cross-section of the intermediate region; and
a pair of tubular second handle portions oriented within the first box, each of the pair of second handle portions comprising a distal end and a proximal end with a square cross-section that is sized to receive the cross-section of the distal end of the first handle therein to assemble the second handle portion of the first handle portion;
a second box containing a hardware kit oriented inside the tray; and
a pair of collars, each with a through aperture with four internal corners and installed upon the proximal end of one of the pair of first handle portions.

16. A wheelbarrow assembly comprising:
a wheelbarrow tray;
a wheel to connect to the tray for rotation relative to the tray, for transportation of the tray upon an underlying support surface; and
a pair of handle assemblies, each handle assembly comprising:
a first unitarily formed handle portion with a distal end, an intermediate region and a proximal end, the proximal end having a cross-section that is reduced relative to a cross-section of the intermediate region, and
a second handle portion with a distal end and a proximal end, the proximal end having a cross-section that is sized to receive the first handle proximal end cross-section therein to assemble the second handle portion to the first handle portion;
wherein the proximal end of the second handle portion has a square cross-section;
wherein the proximal end of the first handle portion is swaged to the reduced cross-section; and
wherein the swaged portion has four side walls and each side wall is recessed.

17. A wheelbarrow assembly comprising:
a wheelbarrow tray;
a wheel to connect to the tray for rotation relative to the tray, for transportation of the tray upon an underlying support surface;
a pair of handle assemblies, each handle assembly comprising:
a first unitarily formed handle portion with a distal end, an intermediate region and a proximal end, the proximal end having a cross-section that is reduced relative to a cross-section of the intermediate region, and
a second handle portion with a distal end and a proximal end, the proximal end having a cross-section that is sized to receive the first handle proximal end cross-section therein to assemble the second handle portion to the first handle portion;
wherein the proximal end of the second handle portion has a square cross-section;
wherein the proximal end of the first handle portion is swaged to the reduced cross-section; and
a collar located at the proximal end of the first handle portion adjacent to the intermediate region to minimize contact between the intermediate region of the first handle portion and the proximal end of the second handle portion.

18. The wheelbarrow assembly of claim 17, wherein the collar is attached to the first handle portion by an adhesive.

19. The wheelbarrow assembly of claim 17, wherein the collar has a through aperture with four internal corners.

20. The wheelbarrow assembly of claim 17 wherein the collar has an angled aperture sized to receive the swaged cross-section of the proximal end of the first handle portion.

21. A wheelbarrow assembly comprising:
a wheelbarrow tray;
a wheel to connect to the tray for rotation relative to the tray, for transportation of the tray upon an underlying support surface; and
a pair of handle assemblies, each handle assembly comprising:

a first unitarily formed handle portion with a distal end, an intermediate region and a proximal end, the proximal end having a cross-section that is reduced relative to a cross-section of the intermediate region, and a second handle portion with a distal end and a proximal end, the proximal end having a cross-section that is sized to receive the first handle proximal end cross-section therein to assemble the second handle portion to the first handle portion; and wherein the first handle portion and second handle portion when assembled do not exceed thirty-two inches allowing the handle portions to fit into a single shipping package.

22. A packaged wheelbarrow assembly comprising:
a first box sized to receive a wheelbarrow tray; and
a disassembled wheelbarrow assembly disassembled and packaged within the first box, the disassembled wheelbarrow assembly comprising:
a wheelbarrow tray,
a wheel to connect to the tray for rotation relative to the tray, for transportation of the tray upon an underlying support surface, and
a pair of handle assemblies, each handle assembly comprising:
a first unitarily formed handle portion with a distal end, an intermediate region and a proximal end, the proximal end having a cross-section that is reduced relative to a cross-section of the intermediate region, and
a second handle portion with a distal end and a proximal end, the proximal end having a cross-section that is sized to receive the first handle proximal end cross-section therein to assemble the second handle portion to the first handle portion; and wherein the first box sized to receive a wheelbarrow tray, has an approximate length of forty centimeters and an approximate width of twenty-seven centimeters.

* * * * *